[11] 3,589,443

[72] Inventor Henry B. Fisher
Bartlesville, Okla.
[21] Appl. No. 769,401
[22] Filed Oct. 21, 1968
[45] Patented June 29, 1971
[73] Assignee Phillips Petroleum Company

[54] SEALING OF PERMEABLE FORMATIONS IN WATER FLOOD RECOVERY OF OIL
2 Claims, No Drawings

[52] U.S. Cl. .................................................. 166/274, 166/292
[51] Int. Cl. ..................................................... E21b 33/138, E21b 43/20
[50] Field of Search .......................................... 166/292, 294, 268, 273—275, 295, 293; 61/36

[56] References Cited
UNITED STATES PATENTS

| | | | |
|---|---|---|---|
| 2,946,383 | 7/1960 | Bearden et al. | 166/295 |
| 2,032,825 | 3/1936 | Ambrose | 166/292 |
| 2,032,826 | 3/1936 | Ambrose et al. | 166/294 |
| 2,272,672 | 2/1942 | Kennedy | 166/292 X |

OTHER REFERENCES

Clark, George L. THE ENCYCLOPEDIA OF CHEMISTRY, N.Y., Reinhold 2nd Ed., 1966, p. 1026 QD 5.C46

Mellor, J. W. A COMPREHENSIVE TREATISE ON INORGANIC AND THEORETICAL CHEMISTRY, N.Y., Longmans, Green, 1930, Vol. 10, pp. 96 & 97 QD 31.M4

*Primary Examiner*—Ian A. Calvert
*Attorney*—Young and Quigg

ABSTRACT: Sulfur in a water-miscible solvent is pumped into a permeable formation which contains water or which can be subsequently flooded therewith. Acetone, dimethyl sulfoxide and other water-miscible liquids which are capable of dissolving sulfur are used to dissolve sulfur to form a solution which will remain stable for several days under tests. This solution is pumped into the permeable formation, whereupon with contact of water therein the sulfur precipitates to cause sealing or plugging of the formation. The method is applied in a method for producing oil by waterflooding.

SEALING OF PERMEABLE FORMATIONS IN WATER FLOOD RECOVERY OF OIL

This invention relates to sealing of permeable formations. In one of its aspects it relates to the sealing of a permeable formation such as an underground formation by precipitating sulfur into said formation. In another of its aspects it relates to sealing such a formation by injecting such a formation with a sulfur solution. The invention relates also to selectively plugging to cause diversion of a flood water in an oil recovery project into oil-containing, as distinguished from water-containing, formation areas.

In one of its concepts the invention provides a method for sealing a formation such as an underground formation by steps as follow: sulfur is dissolved in a water-miscible solvent such as acetone and/or dimethyl sulfoxide or the like, whereupon the solution is pumped into the formation and therein contacted with water which may be there present or which may be added into the formation later.

I have now conceived that adequate plugging or sealing of a formation, for example, an underground formation, or other permeable body can be accomplished suitably by depositing sulfur into the pore space or cells of the structure. Further, I have found that such plugging or sealing can be accomplished by dissolving the sulfur in a water-miscible solvent or carrier, injecting the formation or pore space and therein contacting the sulfur solution with water to cause precipitation of the sulfur.

An object of this invention is to provide a method for sealing or plugging formations. Another object of this invention is to provide a method for depositing sulfur in a preselected area or formations. A further object of the invention is to provide a solution of sulfur which can be employed to carry sulfur to a place at which it is to be deposited. Another object of the invention is to provide an improved waterflood oil recovery method.

Other aspects, concepts and objects of the invention as well as its several advantages are apparent from a study of this disclosure and the claims.

According to the present invention a permeable formation or pore space is plugged by placing therein a solution of sulfur dissolved in a water-miscible solvent following which sulfur is precipitated from the solvent by contacting the same with water.

A colloidal suspension of sulfur is formed when a water-miscible solvent containing dissolved sulfur is mixed with water. This means of sulfur precipitation can be utilized in plugging to various degree a permeable underground formation that contains water or is subsequently flooded with water. For example, sulfur dissolved in a water-miscible solvent can be pumped into a water-containing permeable formation. As water mixes with the sulfur solvent, sulfur is precipitated in a colloidal form. The solids thus formed in the formation capillaries will impede and possibly stop fluid flow. A subsequent waterflood will cause sulfur precipitation from any of the sulfur solvent which was not admixed with water when initially injected. An advantage of my invention is that no plugging will occur in any of the capillaries which contain oil. Thus, plugging will be selective and will cause diversion of flood water, in an oil recovery waterflood project, into areas of the formation which contain oil, since the water-containing formation will have become plugged.

Using DMSO, a colloidal suspension of sulfur was formed by mixing 200 ml. of DMSO (dimethyl sulfoxide), containing 2 pounds dissolved sulfur per bbl. DMSO, with 200 ml. of water at about 150° F. The resulting milky sulfur suspension did not exhibit any settling of solids in 48 hours. This colloidal suspension was then flowed through a permeable glass disc, under differential pressure of one atmosphere, with the following results on flow rates. Water was flowed through the disc both before and after flowing the sulfur suspension. The data shown a marked plugging action by the sulfur suspension.

| Test | Liquid flowing | Ml. thru disc | Time | Rate (ml./min.) at total time |
|---|---|---|---|---|
| 1 | H₂O | 25 | 0.5 min. | 50.0 |
|   |   | +25 | 0.5 min. | 50.0 |
| 2 | Colloidal sulfur suspension | 5 | 1 | 5 |
|   |   | 25 (total) | 6 min.-5 sec. | 2.2 |
|   |   | 50 (total) | 23 min.-45 sec. | 1.3 |
|   |   | 60 (total) |   | 1.2 |
|   |   | 75 (total) | 46 min. | 0.8 |
| 3 | H₂O | 25 | 29 min.-30 sec. | 0.8 |
|   |   | +25 | 51 | 0.5 |
|   |   | +25 | 57 | 0.4 |
| Total |   | 75 | 137.5 min. |   |
| 4 | H₂O (stood dry overnight) | 25 | 5 min.-55 sec. | 4.3 |
|   |   | +25 | 5 min.-30 sec. | 4.5 |
| 5 | H₂O (reversed flow) | 25 | 6 min.-15 sec. | 4.0 |
| 6 | H₂O (reversed flow-orig. dir.) | 25 | 6 min.-35 sec. | 3.8 |
|   |   | +25 | 6 min.-35 sec. | 3.8 |

In an alternative method sulfur dissolved in concentrated NaOH solution would be precipitated on water dilution. Other caustic materials may be used to make a solution of sulfur for use in sealing permeable formations.

From a study of the above disclosure it is apparent that water-flooded or water-containing permeable zones are plugged to various degrees upon injection of a solution of sulfur in a water-miscible solvent. The formation water or flood waters precipitate the sulfur as colloidal sulfur causing plugging while no plugging occurs in oil-containing zones.

It will be evident to one skilled in the art in possession of this disclosure that he can substitute other solvents or diluents for the sulfur for carrying the same into the formation or other place desired to be sealed.

Either crystalline or amorphous sulfur may be used as the solute. The rate at which the sulfur dissolves in the solvent is a accelerated as the temperature is increased. The solubility of sulfur in dimethyl sulfoxide ranges from 0.3 pounds per barrel of solvent at 70° F. to 16 pounds per barrel at 225° F. Dimethyl sulfoxide has a viscosity of 2 c.p.s. at 25° C., is water-miscible hydroscopic organic liquid. Sulfur may be treated with surfactants in order to increase the rate at which they will dissolve in the solvent. The solution is pumped into the well at ordinary atmospheric temperatures.

Reasonable variation and modification are possible within the scope of the foregoing disclosure and the appended claims to the invention the essence of which is that a formation of permeable porous matter which can contain water but which has oil-containing areas can be sealed or plugged by precipitating therein sulfur from a solution of sulfur in a water-miscible solvent, precipitation being brought about by contacting the sulfur solution with water at the place at which the sulfur is to be precipitated and thus selectively sealing or plugging the areas which can contain water while diverting the flood water to the oil containing areas of the formation.

I claim:

1. A method for producing oil by a waterflooding applied to a formation having areas which can contain water which comprises sealing said areas of said formation by forming a solution of sulfur in a water-miscible solvent or carrier, depositing said solution in said areas and therein contacting the same with water thus to seal said areas and thus diverting a waterflood subsequently effected into and through oil-containing portions of the formation and then waterflooding the formation.

2. A method according to claim 1 wherein the sulfur is dissolved in at least one of dimethyl sulfoxide and acetone.